3,124,508
MONO (N-METHYLAMINOETHYL)-PHOSPHORIC ACID FOR HYPERCHOLESTEROLEMIA

Joseph Nordmann, Paris, France, assignor to Compagnie Francaise des Matieres Colorantes, Paris, France, a company of France
No Drawing. Filed Mar. 27, 1962, Ser. No. 182,962
Claims priority, application France Apr. 7, 1961
3 Claims. (Cl. 167—65)

The present invention concerns new medicines with a hypocholesterolemiant action.

It has been found that mono (N-methylaminoethyl)-phosphoric acid and its salts possess interesting properties in the treatment of cases of hypercholesterolemia.

Mono (N-methylaminoethyl)-phosphoric acid has the formula:

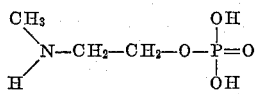

It is a white crystalline substance which is very soluble in water. Its instantaneous melting point on the Maquenne block, after drying, is 203–205° C. It may be identified by its percentage analysis, its melting point and its hydrolysis into phosphoric acid and methylaminoethanol.

It can be prepared, for example, by the method proposed by E. Cherbuliez and J. Rabinowitz (Helv. Chim. Acta, 1958, 41, 1168–75), by the action of pyrophosphoric acid on N-methylaminoethanol. The procedure may be as follows:

458 parts of N-methylaminoethanol (previously rectified) are progressively added to 1633 parts of pyrophosphoric acid contained in an apparatus provided with a rotary stirrer. Since the reaction is exothermic, the temperature of the mixture rises progressively up to 110° C. towards the end of the addition. Total time of addition: one hour. It is then heated at 110–120° C. for three and a half hours. After cooling, the reaction mixture is poured into 4000 parts of water and neutralised successively with barium carbonate (750 parts) and a hot solution of 1800 parts of baryta. The final pH of the suspension is 9 to 10. The barium phosphate is filtered off, centrifuged and extracted twice with 3000 parts of water. The filtrate, containing the soluble barium mono (methylaminoethyl)-phosphate, is acidified with dilute sulphuric acid until methyl orange changes colour. After filtering off the barium sulphate, the filtrate is concentrated in vacuo (20 mms. of Hg) to a third, and a volume of ethyl alcohol equal to the volume remaining (about 3000 parts) is added in order to precipitate the colourless crystalline mono (methylaminoethyl)-phosphoric acid as the monohydrate. Yield: 485 parts. Instantaneous melting point on the Maquenne block, after drying, 203–205° C.

Pharmacological Properties

This compound is not very toxic. In the case of mouse C 57 Black its lethal dose 58 being 5.1 g./kg. when it is injected intraperitoneally in solution in distilled water and over 8 g./kg. when taken orally. Its maximum non-toxic dose is 3 g./kg. by intraperitoneal application in the case of the mouse. At this dose the product causes an appreciable increase of the coagulation time within half an hour to one hour after the injection. The coagulation time becomes normal again three hours after the injection. Nevertheless at the therapeutic doses and up to a dose of 1 g./kg. no action on the coagulation time is observed. At toxic doses it causes a lowering of the central temperature; this property is not found at therapeutic doses. The maximum non-toxic dose when taken orally is 5 g./kg. in the case of the mouse.

The toxicity test on the kidney has not shown any toxic action; in the animals treated no effect on the volume of the diuresis and no trace of alubumin are observed. It is also absolutely harmless on the stomach.

The most remarkable property of mono (N-methylaminoethyl)-phosphoric acid is its action on the blood chloesterol level. This product is in fact capable of entering into the composition of the lecithins which are known for their important action for the transport of the lipids and, in particular, chloesterol and for the protection of the hepatic cell specially in cases of steatosis.

Application in Human Therapy

These results have led to clinical experiments on the product as a hepatic protecting hypocholesterolemiant. The treatment consisted in giving orally doses of mono (N-methylaminoethyl)-phosphoric acid varying between 0.40 and 5 g. per day to patients showing a hypercholesterolemia. For example, a patient had a level of blood cholesterol of 3.18 g./litre; after 10 days treatment consisting in oral absorption of 4 cachets per day each containing a dose of 0.10 g., this level was lowered to 2.75 g./litre. Another patient had a cholesterolemia of 2.7 g./litre; an identical treatment lowered this level to 2.2 g./litre in 10 days.

Another series of experiments has given the following results: mono (N-methylaminoethyl)-phosphoric acid was administered over one month to ten patients showing hypercholesterolemia, in the quantity of 1 g. per day taken in two doses, one before the two main meals or one before breakfast and one before dinner. No patient was put on special diet; however, certain of them whose cholesterol level exceeded 2.80 g. per litre had already excluded giblets, eggs and animal fats from their food or had at least cut down on them. No intolerance was observed nor any change in blood pressure nor any trouble with blood crasis. 8 patients out of 10 had their cholesterol level lowered; the levels before and after treatment are shown below.

|  | Cholesterol level before treatment | Cholesterol level after treatment |
|---|---|---|
| Patient No. 1 | 2.64 | 2.16 |
| Patient No. 2 | 2.95 | 2.45 |
| Patient No. 3 | 2.72 | 2.28 |
| Patient No. 4 | 3.17 | 2.74 |
| Patient No. 5 | 2.77 | 2.63 |
| Patient No. 6 | 3 | 2.10 |
| Patient No. 7 | 2.75 | 2.22 |
| Patient No. 8 | 3.54 | 2.90 |
| Patient No. 9 | 2.78 | 2.93 |
| Patient No. 10 | 2.82 | 3.12 |
| Mean | 2.91 | 2.55 |

The majority of the patients showed improvement in their digestive troubles or their state of tiredness. One must point out that patient No. 10 had clearly made some dietary mistakes.

I claim:
1. Process for the treatment of hypercholesterolemia which comprises orally administering to the patient a member selected from the group consisting of mono (N-methylaminoethyl)-phosphoric acid and its pharmaceutically acceptable acid salts.
2. Process for the treatment of hypercholesterolemia which comprises administering orally to the patient from 0.40 to 5 g. per day of a member selected from the group consisting of mono (N - methylaminoethyl) - phosphoric acid and its pharmaceutically acceptable acid salts.
3. Process for the treatment of hypercholesterolemia which comprises administering orally to the patient 1 g. per day of mono (N - methylaminoethyl) - phosphoric acid.

References Cited in the file of this patent
UNITED STATES PATENTS

| | | |
|---|---|---|
| 2,730,542 | Ferrari | Jan. 10, 1956 |
| 2,829,151 | Britton | Apr. 1, 1958 |
| 2,937,117 | Cottet | May 17, 1960 |
| 3,035,977 | Abood | May 22, 1962 |